(12) United States Patent
Nakanishi et al.

(10) Patent No.: US 7,034,743 B2
(45) Date of Patent: Apr. 25, 2006

(54) RADAR

(75) Inventors: Motoi Nakanishi, Nagaokakyo (JP);
Toru Ishii, Hirakata (JP); Tetsu Nishimura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/516,924

(22) PCT Filed: May 22, 2003

(86) PCT No.: PCT/JP03/06373

§ 371 (c)(1),
(2), (4) Date: Apr. 15, 2005

(87) PCT Pub. No.: WO03/102623

PCT Pub. Date: Dec. 11, 2003

(65) Prior Publication Data

US 2005/0174282 A1    Aug. 11, 2005

(30) Foreign Application Priority Data

Jun. 4, 2002  (JP) .............................. 2002-163349

(51) Int. Cl.
*G01S 13/34* (2006.01)
*G01S 13/93* (2006.01)
(52) U.S. Cl. ..................... 342/128; 342/70; 342/104; 342/109; 342/118; 342/175; 342/192; 342/195; 342/196
(58) Field of Classification Search ................ 701/300, 701/301; 180/167–169; 342/70–72, 104–115, 342/118, 128–133, 145–147, 165, 173–175, 342/192–197
See application file for complete search history.

(56) References Cited

U.S. PATENT DOCUMENTS 5,619,208 A * 4/1997 Tamatsu et al. .............. 342/70
5,963,162 A * 10/1999 Mochizuki et al. ........... 342/70

(Continued)

FOREIGN PATENT DOCUMENTS

JP        05-142338         6/1993

(Continued)

OTHER PUBLICATIONS

Official Communication dated Oct. 25, 2005, issued in the corresponding Japanese Patent Application No. 2002-163349.

*Primary Examiner*—Bernarr E. Gregory
(74) *Attorney, Agent, or Firm*—Keating & Bennett, LLP

(57) ABSTRACT

An FM-CW radar detects at least one of the relative distance and the relative speed of a predetermined object based on the frequencies of projection portions observed in the frequency spectrums of beat signals in an ascending-modulation section and a descending-modulation section, where the projection portions are generated by one and the same object. The radar determines the moving speed of a predetermined moving object such as a vehicle or the like having the radar mounted thereon, and the frequency difference between the projection portions observed in the frequency spectrums of the beat signals in the ascending-modulation section and the descending-modulation section is inversely calculated, where the frequency difference corresponds to the stationary object, and a predetermined pair corresponding to the frequency difference is extracted on a priority basis.

15 Claims, 13 Drawing Sheets

U.S. PATENT DOCUMENTS

| | | | |
|---|---|---|---|
| 6,140,954 A * | 10/2000 | Sugawara et al. | 342/70 |
| 6,249,243 B1 * | 6/2001 | Takagi | 342/70 |
| 6,320,531 B1 * | 11/2001 | Tamatsu | 342/109 |
| 6,369,747 B1 * | 4/2002 | Ashihara | 342/70 |
| 6,674,393 B1 * | 1/2004 | Kishida | 342/70 |
| 6,753,805 B1 * | 6/2004 | Nakanishi et al. | 342/128 |
| 6,795,012 B1 * | 9/2004 | Nakanishi et al. | 342/70 |
| 6,856,278 B1 * | 2/2005 | Nakanishi et al. | 342/128 |
| 6,906,661 B1 * | 6/2005 | Sawamoto et al. | 342/70 |

FOREIGN PATENT DOCUMENTS

| | | |
|---|---|---|
| JP | 07-098375 | 4/1995 |
| JP | 09-145827 | 6/1997 |
| JP | 2000-147103 | 7/1999 |
| JP | 11-211811 | 8/1999 |
| JP | 11-271430 | 10/1999 |
| JP | 11-271433 | 10/1999 |
| JP | 2000-065921 | 3/2000 |

* cited by examiner

FIG. 9A
FIG. 9B
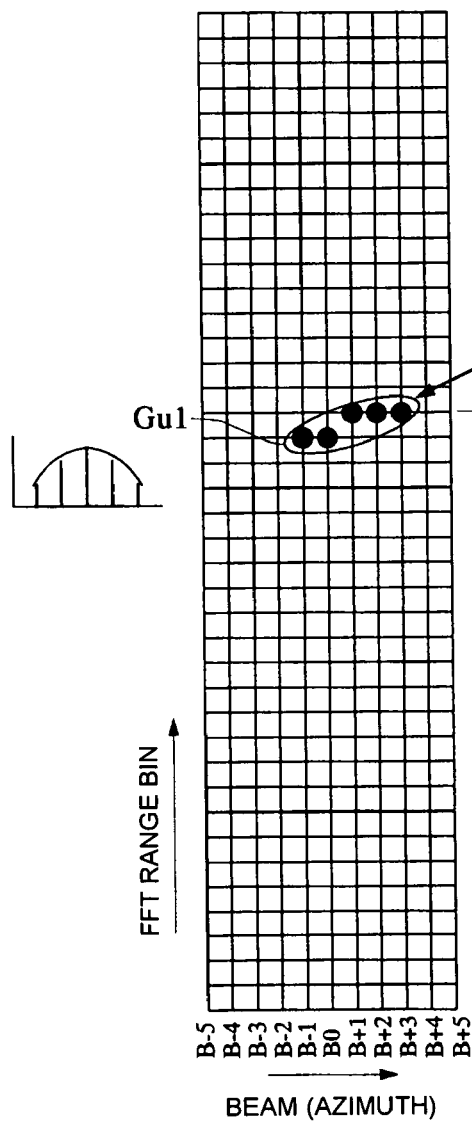
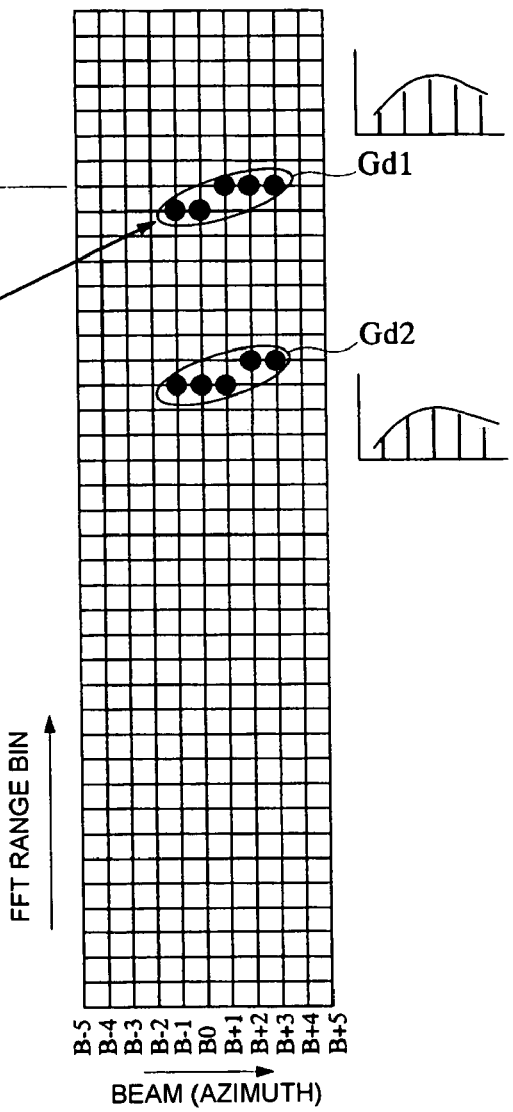

RADAR

TECHNICAL FIELD

The present invention relates to a radar that detects an object by transmitting and receiving a radio wave including a frequency-modulated continuous wave.

BACKGROUND ART

Hitherto, FM-CW radars using a millimeter wave have been developed, as on-vehicle radars, for example. The FM-CW radar detects an object by transmitting and receiving a radio wave including a frequency-modulated (FM) continuous wave (CW). That is to say, the FM-CW radar transmits a transmission signal including an ascending-modulation section and a descending-modulation section that are observed in an alternating manner, where a frequency gradually ascends in the ascending-modulation section and gradually descends in the descending-modulation section, receives a reception signal including a reflection signal transmitted from the object, and obtains the relative distance and relative speed of the object based on the frequency spectrums of beat signals denoting the frequency difference between the transmission signal and the reception signal. Further, the FM-CW radar performs the above-described operations for a single beam directed to a predetermined azimuth and changes the beam azimuth in sequence, thereby calculating the azimuths of objects distributed over a predetermined azimuth-angle range.

In the case where a single object exists, a single projection portion is observed in each of the frequency spectrums of beat signals corresponding to a reflection wave transmitted from the object in the ascending-modulation section and the descending-modulation section. Therefore, the relative distance and relative speed of the object can be obtained based on the peak frequencies of the projection portions, where the peak frequencies include the beat-signal frequency in the ascending-modulation section (hereinafter referred to as an "upbeat frequency") and the beat-signal frequency in the descending-modulation section (hereinafter referred to as a "downbeat frequency").

However, where a plurality of objects exists in a predetermined detection range, a plurality of projection portions is observed in the frequency spectrums, for one and the same beam, in the ascending-modulation section and the descending-modulation section. Therefore, an error may occur in combinations of a plurality of upbeat frequencies and a plurality of downbeat frequencies (hereinafter referred to as "pairing").

Further, where the FM-CW radar is used, as the on-vehicle radar, it is crucial to determine whether an object is a vehicle or a stationary object.

Subsequently, Document No. 1: Japanese Unexamined Patent Application Publication No. 7-98375 discloses a radar that determines a predetermined object to be a stationary object, where the relative speed of the object is the same as the vehicle speed. Document No. 2: Japanese Unexamined Patent Application Publication No. 5-232214 discloses a radar that determines a predetermined object to be a stationary object, where the relative speed of the object is the same as the vehicle speed and where the spectrums of beat signals of the object spread out. Document No. 3: Japanese Unexamined Patent Application Publication No. 11-211811 discloses a radar that determines a predetermined object to be a continuous road-side object, where the frequency spectrums of the beat signals have a peak with a predetermined density or more. Further, Document No. 4: Japanese Unexamined Patent Application Publication No. 2000-147103 discloses a radar that infers data on a stationary object from the stationary-object-location data in the past.

However, according to the research of inventors of the present invention, the above-described known radars have the following problems.

Where an error occurs during pairing, the radars disclosed in Documents No. 1 and No. 2 cannot detect a stationary object and erroneously detects a moving object at a predetermined distance in the direction of the stationary object.

The radar disclosed in Document No. 3 cannot detect a predetermined object, as a road-side object, where the object has a small width in the azimuth direction, as in the case of a road sign, a column of some kind, and so forth.

In the case of a continuous road-side object or the like, the intensity of a reflection signal transmitted from the same position (azimuth) is not high at all times. Therefore, it is not easy for the radar disclosed in Document No. 4 to extract the continuous road-side object based on historical data.

Subsequently, an object of the present invention is to provide a radar for solving the above-described problems, so as to detect a stationary object with ease and stability, and reduce mispairing.

DISCLOSURE OF INVENTION

The present invention provides a radar including a transmission-and-reception element for transmitting a transmission signal including an ascending-modulation section where a frequency gradually increases and a descending-modulation section where the frequency gradually decreases in an alternating manner and receiving a reception signal including a reflection signal transmitted from an object, a frequency-analysis element for obtaining data on the frequency spectrum of a beat signal indicating the frequency difference between the transmission signal and the reception signal, a pair-extraction element for extracting a pair of first and second projection portions caused by one and the same object, where the first projection portion is observed in the frequency spectrum of a beat signal of the ascending-modulation section and the second projection portion is observed in the frequency spectrum of a beat signal of the descending-modulation section, and a predetermined element for detecting at least one of the relative distance and relative speed of the object based on frequencies of the two projection portions forming the pair.

The radar is characterized in that a predetermined element for inputting data on the moving speed of a moving object having the radar mounted thereon is provided, where the moving speed is measured by a predetermined element other than the radar, and the pair-extraction element inversely calculates the frequency difference between the projection portions observed in the frequency spectrums of the beat signals in the ascending-modulation section and the descending-modulation section based on the moving-speed data, where the frequency difference corresponds to a stationary object, and extracts a pair corresponding to the frequency difference on a priority basis.

The pair-extraction element calculates the coincidence of the signal intensity of the first projection portion and the signal intensity of the second projection portion, extracts a combination showing high coincidence on a priority basis, as a pair, and assigns a high weight to the signal-intensity coincidence of a pair showing the frequency difference corresponding to the stationary object.

Further, the present invention includes a scanning element for changing the beam azimuth of the transmission signal over a predetermined scanning range. The pair-extraction element calculates the coincidence of azimuths of the first and second projection portions, extracts a combination showing high coincidence on a priority basis, as a pair, and assigns a high weight to the azimuth coincidence of a pair showing the frequency difference corresponding to the station object.

Further, according to the present invention, the pair-extraction element calculates the degree of correlation between signal-intensity profiles in the azimuth direction of the first and second projection portions, extracts a combination showing a high correlation degree on a priority basis, as a pair, and assigns a high weight to the correlation degree of a pair showing the frequency difference corresponding to the stationary object.

Further, the present invention provides a predetermined element. Where a predetermined number of the pairs showing the frequency difference corresponding to the stationary object exist along at least one of the azimuth direction and the distance direction, the element determines the pairs to be a continuous stationary object.

Further, the present invention provides a predetermined element. Where a predetermined pair showing the frequency difference corresponding to the stationary object is detected in a predetermined area where the continuous stationary object exists, the element determines that the pair extraction is an error.

Further, the present invention provides a predetermined element. Where a predetermined object is detected beyond the continuous stationary object, the element does not output the detection result.

BRIEF DESCRIPTION OF THE DRAWINGS

FIGS. 9(A) and 9(B) show therefor example signal-intensity profiles in the azimuth direction of projection-portion groups.

BEST MODE FOR CARRYING OUT THE INVENTION

Figure 1:
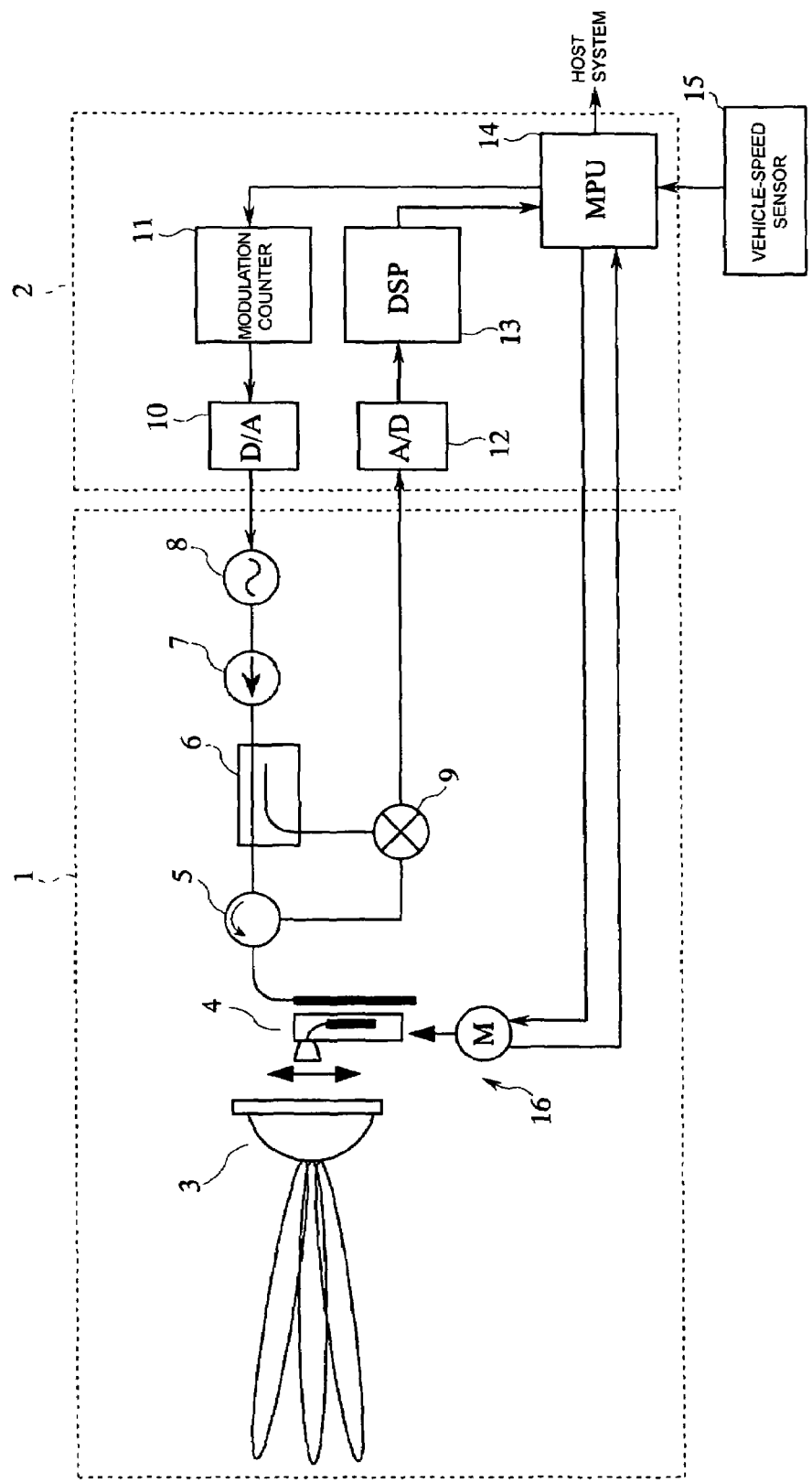
FIG. 1 is a block diagram showing the configuration of a radar.

FIG. 1 is a block diagram showing the configuration of a radar according to an embodiment of the present invention.

In FIG. 1, reference numeral 1 denotes an RF block and reference numeral 2 denotes a signal-processing block. The RF block 1 transmits and receives radio waves for radar measurement and transmits beat signals of a transmission wave and a reception wave to the signal-processing block 2. A modulation counter 11 of the signal-processing block 2 performs counting, so that a DA converter 10 generates a triangular-wave signal, as a result. Then, the modulation counter 11 transmits the value to the DA converter 10. The DA converter 10 converts the value to an analog-voltage signal and transmits the analog-voltage signal to a VCO (voltage control oscillator) 8 of the RF block 1, whereby the transmission wave is frequency modulated. That is to say, an oscillation signal of the VCO 8 is transmitted to a primary radiator 4 via an isolator 7, a coupler 6, and a circulator 5. The primary radiator 4 is provided on or near a focal plane of a dielectric lens 3 and the dielectric lens 3 transmits a millimeter-wave signal radiated from the primary radiator 4, as a sharp beam. Where a reflection wave transmitted from an object (a vehicle or the like) is made incident on the primary radiator 4 via the dielectric lens 3, a reception signal is led to a mixer 9 via the circulator 5. The reception signal and a local signal that is part of the transmission signal transmitted from the coupler 6 are transmitted to the mixer 9. Then, a beat signal corresponding to the signal of the difference between the frequency of the reception signal and that of the local signal is transmitted to an AD converter 12 of the signal-processing block 2, as an intermediate-frequency signal. The AD converter 12 converts the intermediate-frequency signal to digital data. A DSP (digital-signal processor) 13 performs FFT (fast Fourier transformation) processing for a data string transmitted from the AD converter 12 and calculates a relative distance and a relative speed to the object, which will be described later.

A portion 16 of the RF block 1 denotes a scan unit for making the primary radiator 4 move parallel to itself on the focal plane of the dielectric lens 3, or a plane parallel to the focal plane. A 0-dB coupler is formed between a movable unit where the primary radiator 4 is provided and the fixed-unit side. A portion indicated by reference character M denotes the driving motor thereof. The motor allows performing beam scanning in a predetermined area of from negative ten degrees to positive ten degrees in a cycle of 100 ms, for example.

Reference numeral 14 shown in the signal-processing block 2 denotes a microprocessor for controlling the modulation counter 11 and the scan unit 16. The microprocessor 14 determines the counting cycle for the scan unit 16 so that the beam azimuth is directed at a predetermined angle and the VCO 8 is modulated by a triangular wave corresponding to a single crest of an ascending section and a descending section within the standstill time period of the scan unit 6. The microprocessor 14 corresponds to a "scanning element" relating to the present invention. The microprocessor 14 extracts a pair of a projection portion observed in a frequency spectrum of an ascending-modulation section and a projection portion observed in a frequency spectrum of a descending-modulation section that are obtained by the DSP 13 (pairing). Further, a vehicle-speed sensor 15 detects the own-vehicle speed and the microprocessor 14 reads the own-vehicle speed from the vehicle-speed sensor 15 and performs pairing for a pair corresponding to a stationary item on a priority basis.

Figure 2:
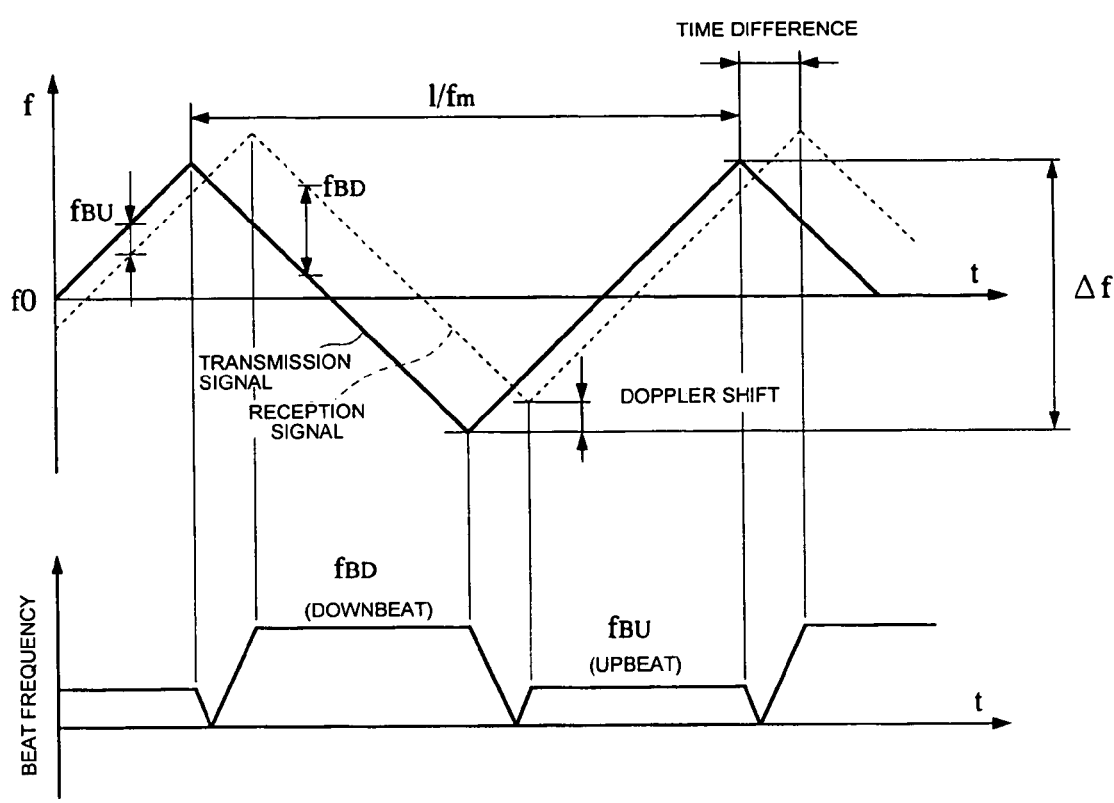
FIG. 2 shows an example frequency difference between beat signals observed in an ascending-modulation section and a descending-modulation section of the radar.

FIG. 2 shows an example difference between the frequency change of the transmission signal and that of the reception signal caused by the distance and the relative speed to the object. An upbeat frequency $f_{BU}$ means the frequency difference between the transmission signal and the reception signal during the frequency of the transmission signal increases. Further, a downbeat frequency $f_{BD}$ means the frequency difference between the transmission signal and the reception signal during the frequency of the transmission signal decreases. The symbol Δf denotes the frequency-shift width. The discrepancy between the triangular wave of the transmission signal and that of the reception signal on the time axis (the time difference) corresponds to a time period required for a radio wave to travel between an antenna and the object. Further, the discrepancy between the transmission signal and the reception signal on the frequency axis corresponds to a Doppler-shift amount generated due to the object's relative speed to the antenna. The values of the upbeat $f_{BU}$ and the downbeat $f_{BD}$ change according to the time difference and the Doppler-shift amount. That is to say, the distance between the radar and the object and the object's relative speed to the radar are calculated by detecting the frequency of the upbeat and that of the downbeat.

Figure 3:
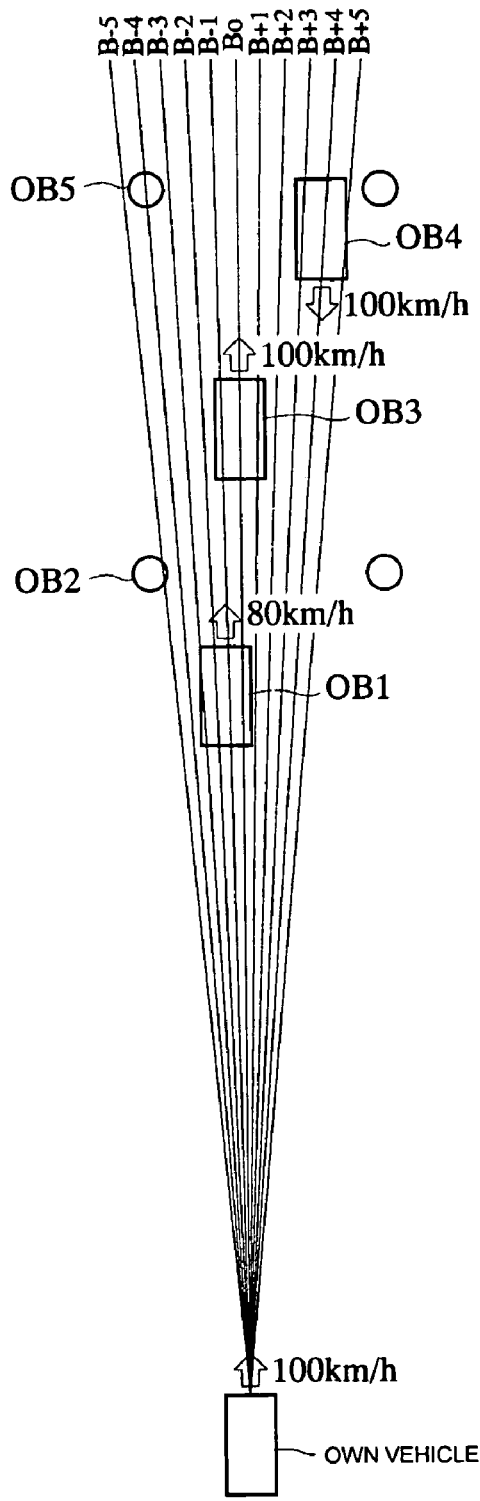
FIG. 3 shows example objects of various kinds ahead of an own vehicle.

FIG. 3 shows an example relationship between the azimuths of transmission and reception beams of the radar and a plurality of objects. Here, the sign Bo denotes a frontal direction of the vehicle mounted on the own vehicle. B+1, B+2, and so forth indicate beam azimuths obtained where the beam azimuth is modified from the front to the right. Similarly, B−1, B−2, and so forth indicate beam azimuths obtained where the beam azimuth is modified from the front to the left.

Objects OB2 and OB5 indicated by circles shown in FIG. 3 denote fixed objects on the road side. Further, objects OB1, OB3, and OB4 indicated by squares denote other vehicles ahead of the own vehicle. The traveling directions of the other vehicles are indicated by arrows.

In FIG. 3, the relative speed to the road-side objects including the OB2, OB5, and so forth, and stationary objects such as perked vehicles on the road is the same as the own-vehicle speed. Therefore, pairing is performed by using data on the own-vehicle speed obtained by a vehicle-speed sensor, so as to increase the pairing accuracy.

When we travel under normal conditions free of congestion, objects picked up by the radar are stationary objects including a guardrail, a sign, a sound-proof wall, a street light, and so forth, in most cases. Further, in most times, traveling vehicles keep a predetermined distance therebetween except when the road is congested. Therefore, the distance between two vehicles hardly corresponds to the frequency difference (the difference between the upbeat frequency and the downbeat frequency) that is almost the same as that in the case of a stationary object.

Therefore, the frequency difference between the projection portions observed in the frequency spectrums of the ascending-modulation section and the descending-modulation section is inversely calculated based on the own-vehicle speed, a pair corresponding to the frequency difference is extracted, and the other projection portions are paired up with one another. Subsequently, the distance and speed of a moving object is calculated.

Figure 4:
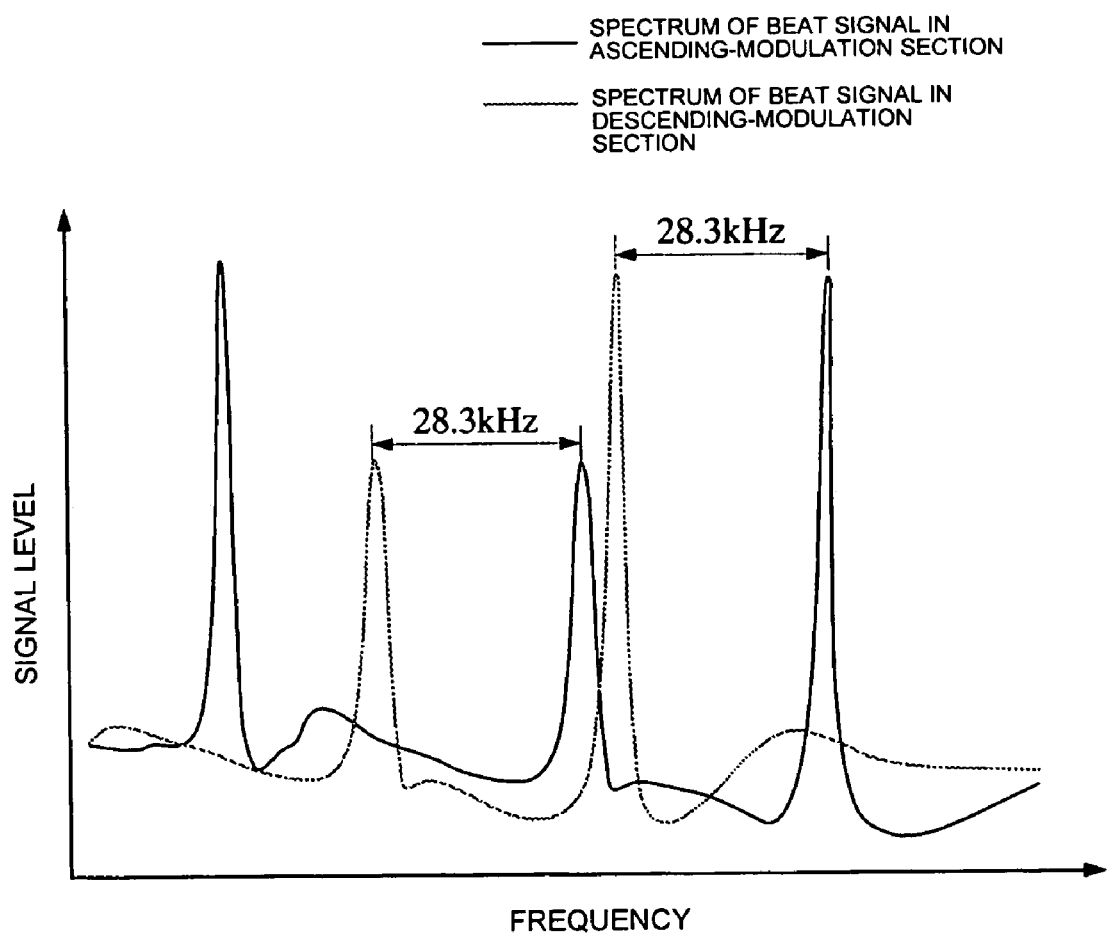
FIG. 4 shows example frequency spectrums of the beat signals observed in the ascending-modulation section and the descending-modulation section.

FIG. 4 shows example frequency spectrums of beat signals in the ascending-modulation section and the descending-modulation section. Here, a solid line indicates the frequency spectrum of the beat signal in the ascending-modulation section and a broken line indicates the frequency spectrum of the beat signal in the descending-modulation section. In the frequency range shown in FIG. 4, three projection portions are observed in the beat signal in the ascending-modulation section and two projection portions are observed in the beat signal in the descending-modulation section. Further, if the center frequency f0 of a modulation signal is shown by the expression f0=76.5 GHz, where the own-vehicle speed V is 100 km/h, at that time, the difference between the frequency of the beat signal in the ascending-modulation section and the frequency of the beat signal in the descending-modulation section is shown, as below.

$$f_{BU} - f_{BD} = 4 * f0 * V / c$$
$$= 28.3 \text{ kHz}$$

Here, the letter c indicates the speed of light.

In the example shown in FIG. 4, the frequency differences between the two projection portions observed in the frequency spectrum of the beat signal in the ascending-modulation section and the two projection portions generated in the frequency spectrum of the beat signal of the descending-modulation section are 28.3 kHz. Therefore, the projection portions are extracted, as pairs. That is to say, two stationary objects are detected.

However, since extracting projection portions showing the frequency difference corresponding to a stationary object is inadequate, the following problems occur.

In the above-described example, where the frequency-shift width Δf is 300 MHz, the reciprocal of a modulation cycle, that is, the modulation frequency fm is 500 Hz, and two vehicles travel at a speed of 100 km/h with a distance of about 14.1 m therebetween, the frequency difference $f_B$ (=$f_{BU}$−$f_{BO}$) between the beat signals is expressed by:

$$f_B = 4 * R * fm * \Delta f / c$$
$$= 4 * 14.1 * 500 * 3.0 * 10^8 / 3.0 * 10^8$$
$$= 28.2 \text{ kHz.}$$

Here, the letter R indicates a distance and the letter c indicates the speed of light.

According to the above-described relationship, the peak-frequency distance between the projection portions generated by reflection waves of the two vehicles substantially matches with the frequency difference caused by the stationary objects.

Figure 6A:
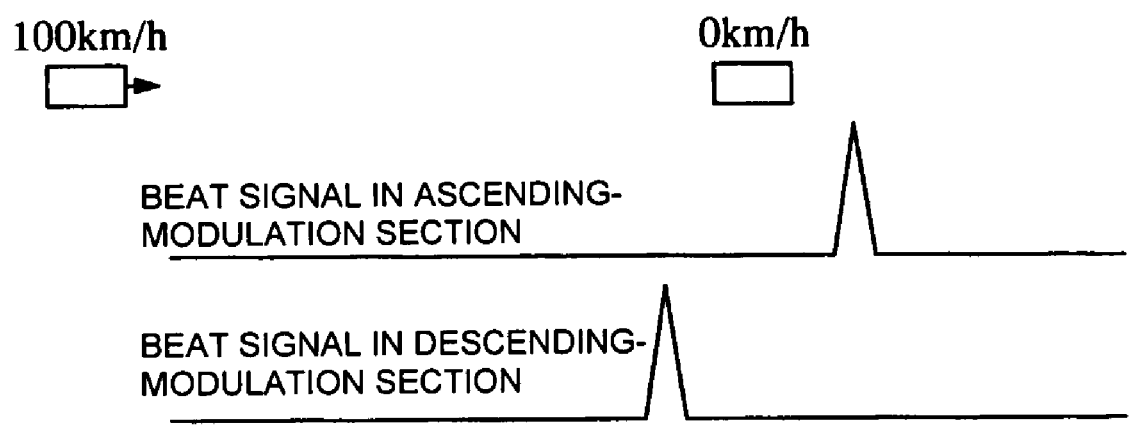
FIGS. 6(A) and 6(B) illustrate therefore, an example state and example frequency spectrums of vehicles ahead of the own vehicle.
Figure 6B:
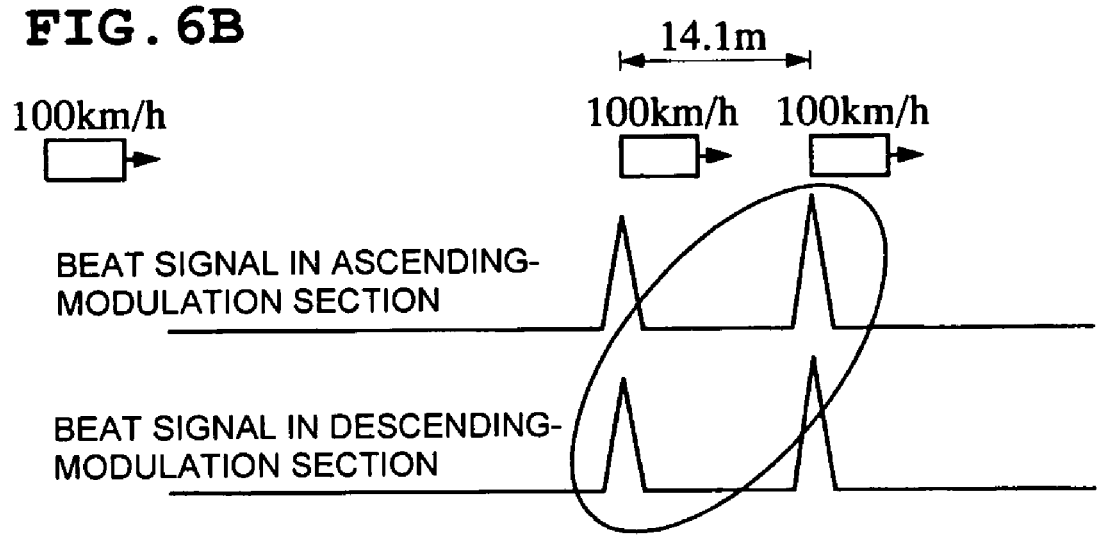

FIGS. 6(A) and 6(B) show therefor the above-described example. FIGS. 6(A) and 6(B) show therefor the state of the frequency spectrums of beat signals and two vehicles in the ascending-modulation section and the descending-modulation section. FIG. 6(A) shows a spectrum generated by a vehicle at 0 km/h, that is, a stationary vehicle and FIG. 6(B) shows a spectrum generated by the two vehicles traveling ahead of the own vehicle at a predetermined distance therefrom at the speed of 100 km/h with a distance of 14.1 m therebetween.

Where two projection portions generated by two objects are paired with each other in the above-described manner, projection portions showing the frequency difference of 28.3 kHz corresponding to the stationary object may be paired off with each other and extracted on a priority basis.

Further, in other cases, the traveling object may be misidentified as a stationary object, even though a tight turn, a vehicle traveling unsafely, and so forth exist.

Subsequently, instead of pairing a combination whose frequency difference between beat signals in the ascending-modulation section and the descending-modulation section corresponds to the frequency difference caused by a stationary object, a more suitable combination should be extracted, as a pair. Therefore, the following processing is performed.

Figure 5:
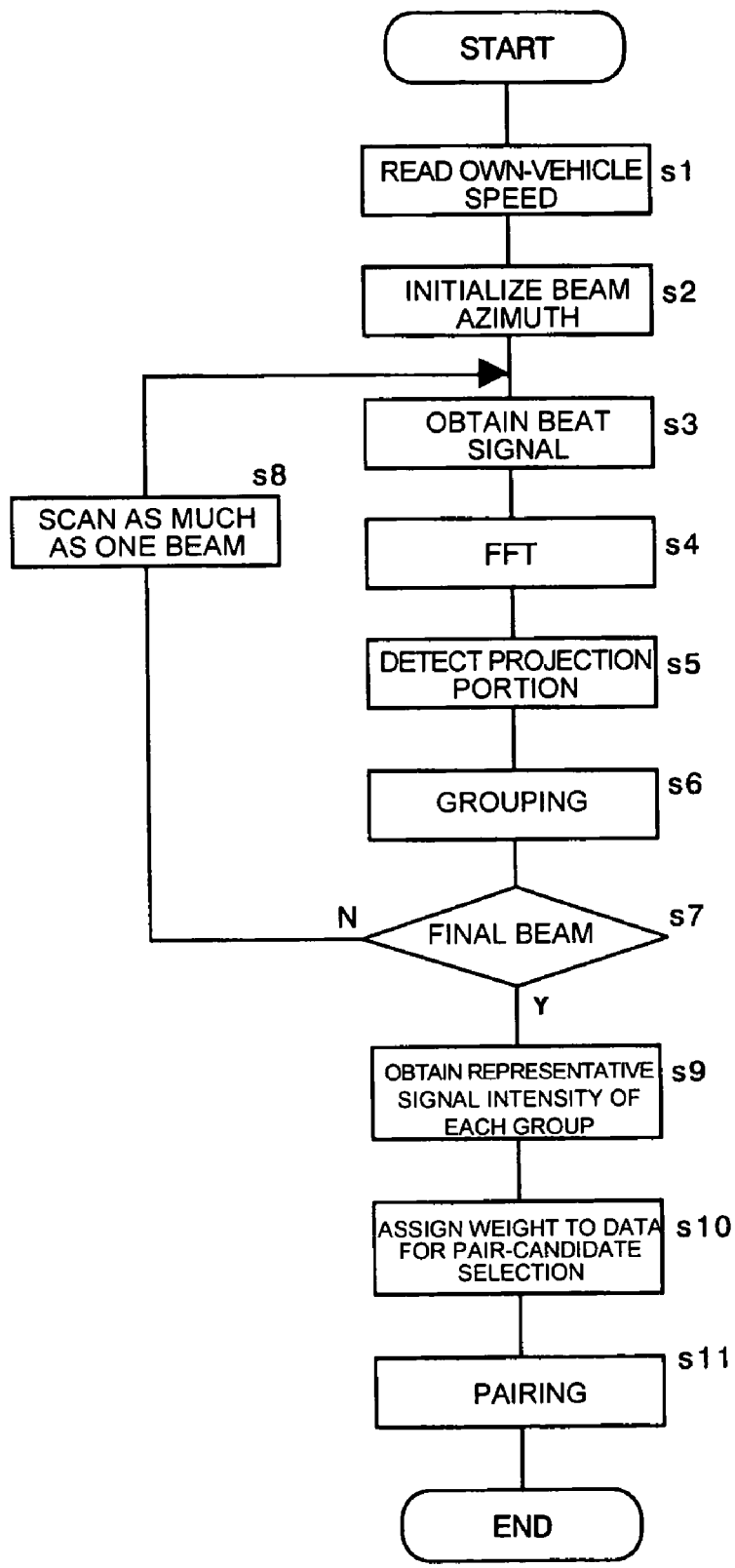
FIG. 5 is a flowchart showing processing procedures performed by the radar.

FIG. 5 is a flowchart showing processing procedures performed by the DSP 13 and the microprocessor 14 shown in FIG. 1. First, data on the own-vehicle speed is read from the vehicle-speed sensor 15 (s1). Then, a beam is steered in an initial azimuth under the control of the scan unit 16 (s2). In that state, the beat-signal digital data converted through the A/D converter 12 is obtained, as many as a predetermined sampling number, and subjected to FFT processing (s3→s4).

Then, a crest-shaped projection portion of the signal intensity of the frequency spectrum is detected, and the peak frequency of the projection portion and the signal intensity corresponding to the peak frequency are extracted (s5).

After that, by referring a peak frequency extracted in the previous adjacent beam azimuth and the signal intensity thereof, it is determined to which group the peak frequency in the current beam azimuth and the signal intensity thereof should belong (s6). That is to say, peak frequencies whose differences correspond to a predetermined frequency or lower are grouped.

Then, the beam azimuth is shifted by as much as a single beam and the same processing is performed (n7→s8→ s3 . . . ).

By performing the above-described processing repetitively up to the final beam, a peak frequency spectrum is obtained for each beam azimuth in the ascending-modulation section and the descending-modulation section over a detection range having a predetermined width extending in the azimuth direction.

Next, the representative azimuth, representative peak frequency, and representative signal intensity of each group are obtained, as a pair candidate, and a level profile in the azimuth direction is obtained (s9). For example, the center azimuth of a predetermined group extending in the beam-azimuth direction and the frequency-axis direction is determined to be the representative azimuth and the center of a predetermined frequency range extending on the frequency axis in the above-described azimuth is determined to be the representative peak frequency, and the signal intensity of the representative peak frequency is determined to be the representative signal intensity. Further, the change in the signal intensity in the azimuth direction of the representative frequency of the group is obtained, as a signal-intensity profile. The above-described representative values of each group are obtained for each of the ascending-modulation section and the descending-modulation section.

After that, the coincidence of predetermined pair candidates showing a frequency difference corresponding to a stationary object is weighted, so that the pair candidates are paired up with each other on a priority basis. Subsequently, pairing is performed (s10→s11).

Here, the signal-intensity coincidence is determined to be Ma, the coincidence of the azimuths is determined to be Md, and the coincidence of the signal-intensity profiles is determined to be Mc. Where the weight of the pair-evaluation value indicating pair characteristics is determined to be m, the pair-evaluation value E is expressed by:

$$E = m(Ma*Md*Mc) \qquad \text{Equation (1)}.$$

The above-described coincidences Ma, Md, and Mc are coefficients of from zero to one and the weight m is a value of at least one.

The pair-evaluation value E is obtained for each of possible combinations of the representative values of the projection-portion groups extracted, as the pair candidates, and the pair candidates are paired up with one another in order of decreasing values. The above-described weight m gives a large value greater than one to a predetermined pair showing the frequency difference corresponding to the stationary object. As for the other pairs, the value of m is expressed by the equation m=1.

In the above-described example, the pair-evaluation value E is obtained by assigning the weight m to the signal-intensity coincidence, the azimuth coincidence, and the signal-intensity-profile coincidence. However, the above-described three coincidences may be modified separately so that the combination showing the frequency difference corresponding to the stationary object is extracted on the priority basis, as a pair.

Figure 7:
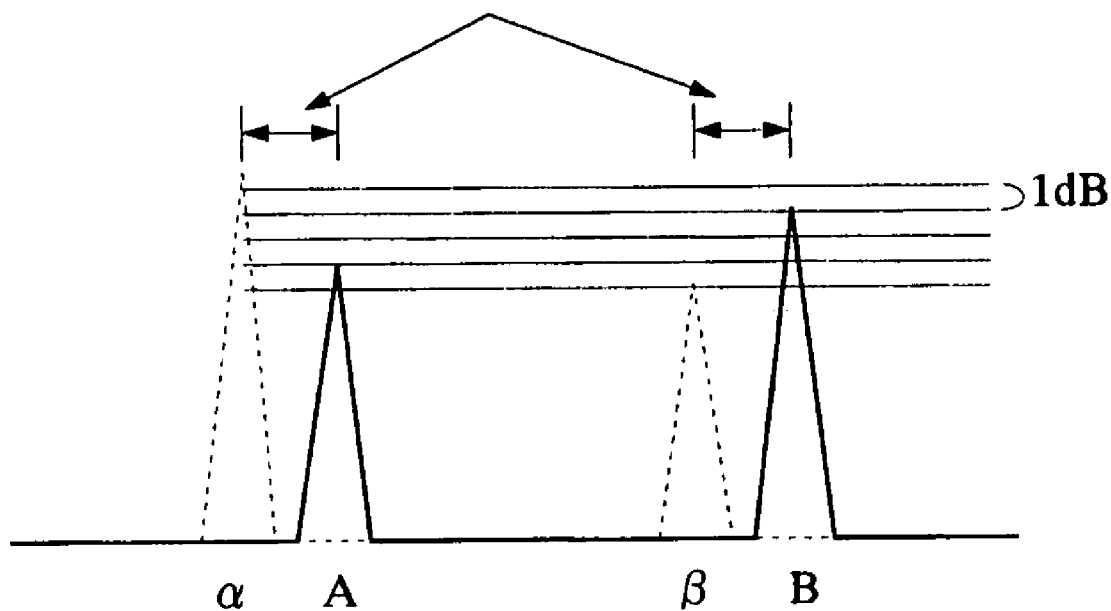
FIG. 7 illustrates an example difference between the signal intensity of a projection portion observed in the frequency spectrum of the beat signal in the ascending-modulation section and the signal intensity of a projection portion observed in the frequency spectrum of the beat signal in the descending-modulation section.

FIG. 7 shows an example where the signal-intensity coincidence is modified. Here, reference characters A and B denote projection portions observed in the frequency spectrum of the beat signal in the ascending-modulation section and reference characters α and β denote projection portions observed in the frequency spectrum of the beat signal in the descending-modulation section. Here, in the example shown in FIG. 7, the signal-intensity difference between α and A is 3 dB, and the signal-intensity difference between α and B is 1 dB. However, since the combination of α and A presents the frequency difference corresponding to the stationary object, the signal-intensity difference is decreased by as much as 3 dB, and the signal-intensity coincidence is obtained. Therefore, the signal-intensity difference between α and A becomes 0 dB after the modification, so that the priority of the combination of α and A is higher than that of the combination of α and B. Where the signal-intensity coincidence after the modification is determined to be Ma', the entire pair-evaluation value E is expressed by:

$$E = (Ma'*Md*Mc) \qquad \text{Equation (2)}.$$

Figure 8A:
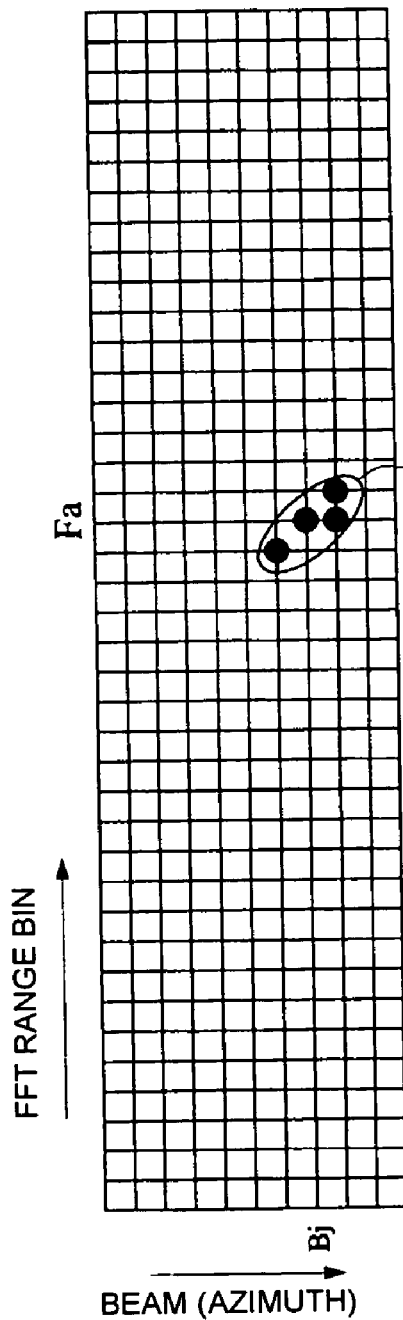
FIGS. 8(A) and 8(B) show therefor an example distribution of projection portions observed in the frequency spectrums of the beat signals on the beam-azimuth axis and the frequency axis.
Figure 8B:
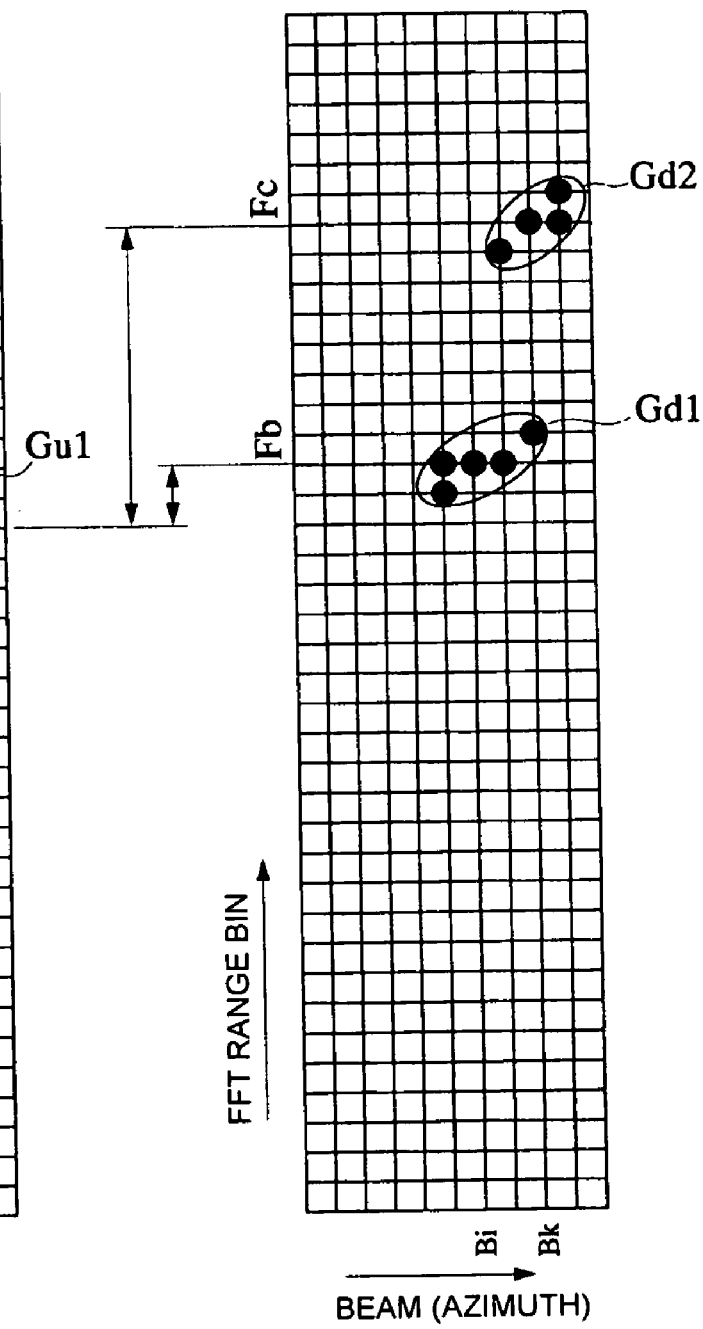

FIGS. 8(A) and 8(B) show therefor an example where the coincidence of the azimuths is modified. FIG. 8(A) shows the peak frequency of the projection portion observed in the frequency spectrum of the beat signal in the ascending-modulation section for each of beams of different azimuths and FIG. 8(B) shows the peak frequency of the projection portion observed in the frequency spectrum of the beat signal in the descending-modulation section. Here, the horizontal axis shows the beam azimuths and the vertical axis shows the frequencies of the projection portions in the frequency spectrums so that the beam azimuths and the frequencies are expressed by Cartesian coordinates.

In the above-described example, the group Gu1 including a projection portion extending along the azimuth direction and the frequency-axis direction in the ascending-modulation section, centered on the beam azimuth Bj and the frequency Fa, is observed, as shown in FIG. 8(A). Further, as shown in FIG. 8(B), the group Gd1 including a projection portion extending along the azimuth direction and the frequency-axis direction in the descending-modulation section, centered on the beam azimuth Bi and the frequency Fb, is observed. Further, the group Gd2 including a projection portion extending along the azimuth direction and the frequency-axis direction in the descending-modulation section, centered on the beam azimuth Bk and the frequency Fc, is observed.

Where the frequency difference between the representative frequency Fa of the group Gu1 and the representative frequency Fc of the group Gd2 is the frequency difference corresponding to the stationary object, and an azimuth-angle difference between the representative azimuth Bj of the group Gu1 and the representative azimuth Bk of the group Gd2 is within ±1.0°, the azimuths are considered to be the same as each other. Since the frequency difference between the representative frequency Fa of the group Gu1 and the representative frequency Fb of the group Gd1 does not correspond to the stationary object, the angle difference between the representative azimuths of both the groups is regarded as the difference between the beam azimuth Bj and the beam azimuth Bi.

Thus, the coincidences of the azimuths are modified. Where the azimuth coincidence after the modification is determined to be Md', the entire pair-evaluation value E is expressed by:

$$E=(Ma*Md'*Mc)  \quad \text{Equation (2)}.$$

FIGS. 9(A) and 9(B) show-therefor example modification of the coincidence of the signal-intensity profiles. Here, the representative-frequency difference between the group Gu1 and the group Gd1 is the frequency difference corresponding to the stationary object, the coincidence of both the signal-intensity profiles is modified, so as to be increased. For example, where the coincidence of the signal-intensity profiles is calculated, as a correlation coefficient, the difference between the correlation-coefficient value and 1.0 is reduced at a predetermined rate (e.g. ½) for evaluation. For example, where the correlation coefficient of the signal-intensity profiles of the groups Gu1 and Gd1 is 0.7 and the correlation coefficient of the signal-intensity profiles of the groups Gu1 and Gd2 is 0.8, the former is modified, as shown by the expression 0.7+(1−0.7)/2=0.85, so that the coincidence of the signal-intensity profiles increases.

The coincidence of the signal-intensity profiles after the modification is determined to be Mc', the entire pair-evaluation value E is expressed by:

$$E=(Ma*Md*Mc')  \quad \text{Equation (3)}.$$

Next, the details of processing performed by a radar according to a second embodiment will be described with reference to FIGS. 10(A) to 13.

Figure 10A:
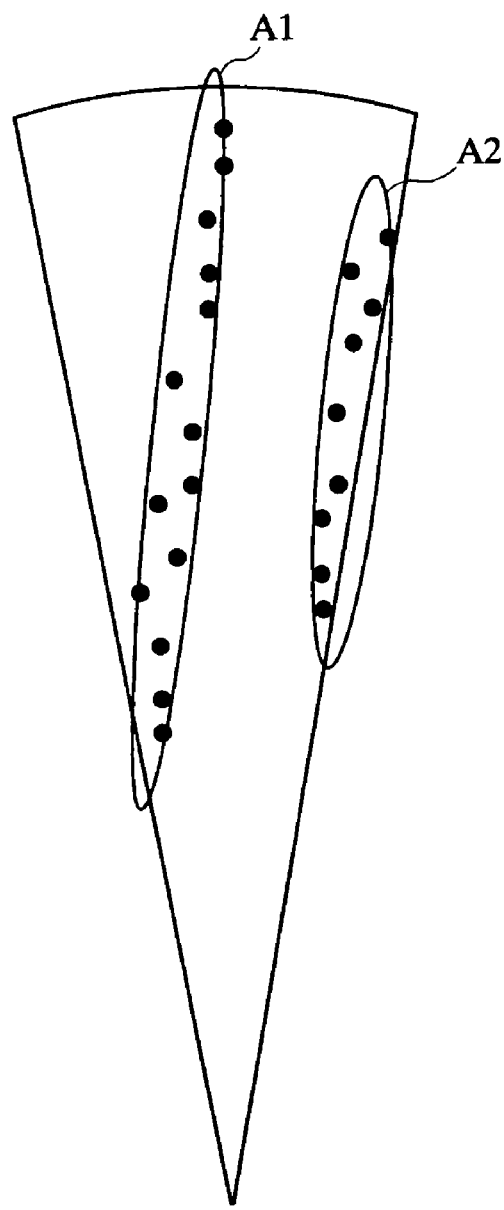
FIG. 10(A) and 10(B) illustrate therefor an example continuous stationary object and an example area where the continuous stationary object exists.
Figure 10B:
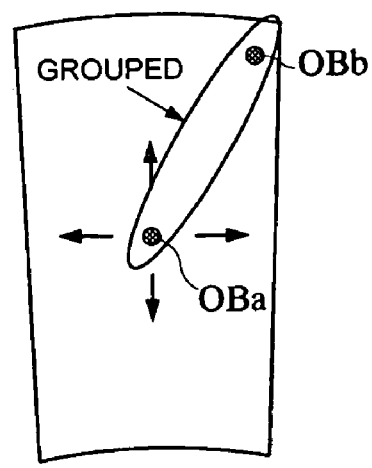

FIGS. 10(A) and 10(B) show therefor the locations of objects calculated by using the pairs extracted according to the method shown in the first embodiment. Black circles indicate the locations of objects. Where the objects include a continuous road-side object such as a guardrail, a soundproof wall, a median, the wall of a building, and so forth, a plurality of stationary objects close to one another is detected, as shown in FIG. 10(A). The above-described sequence of stationary objects is determined to be a continuous stationary object. In an example shown in FIG. 10(A), two continuous stationary objects A1 and A2 are determined.

Determination whether or not the stationary objects are close to each other is performed by grouping stationary objects detected in a predetermined distance and a predetermined azimuth-angle range. For example, where a stationary object OBb exists within a predetermined distance and a predetermined azimuth-angle range with reference to a predetermined stationary object OBa, as shown in FIG. 10(B), it is determined that the stationary object OBb belongs to the same group that the stationary object OBa belongs to. Next, the same processing is performed for the stationary object OBb and grouping is performed in sequence.

Figure 10C:
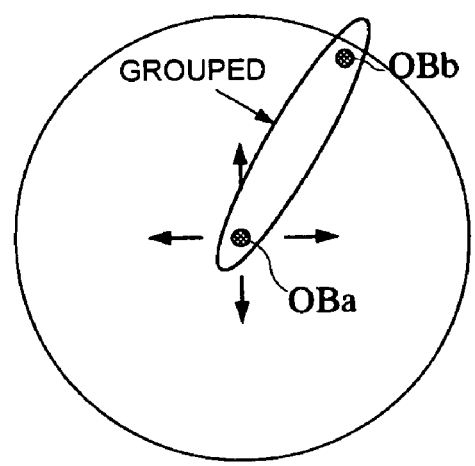

The above-described processing may be performed on the Cartesian coordinates, as shown in FIG. 10(C). That is to say, stationary objects existing in a predetermined distance range on the Cartesian coordinates may be grouped in sequence.

Figure 11:
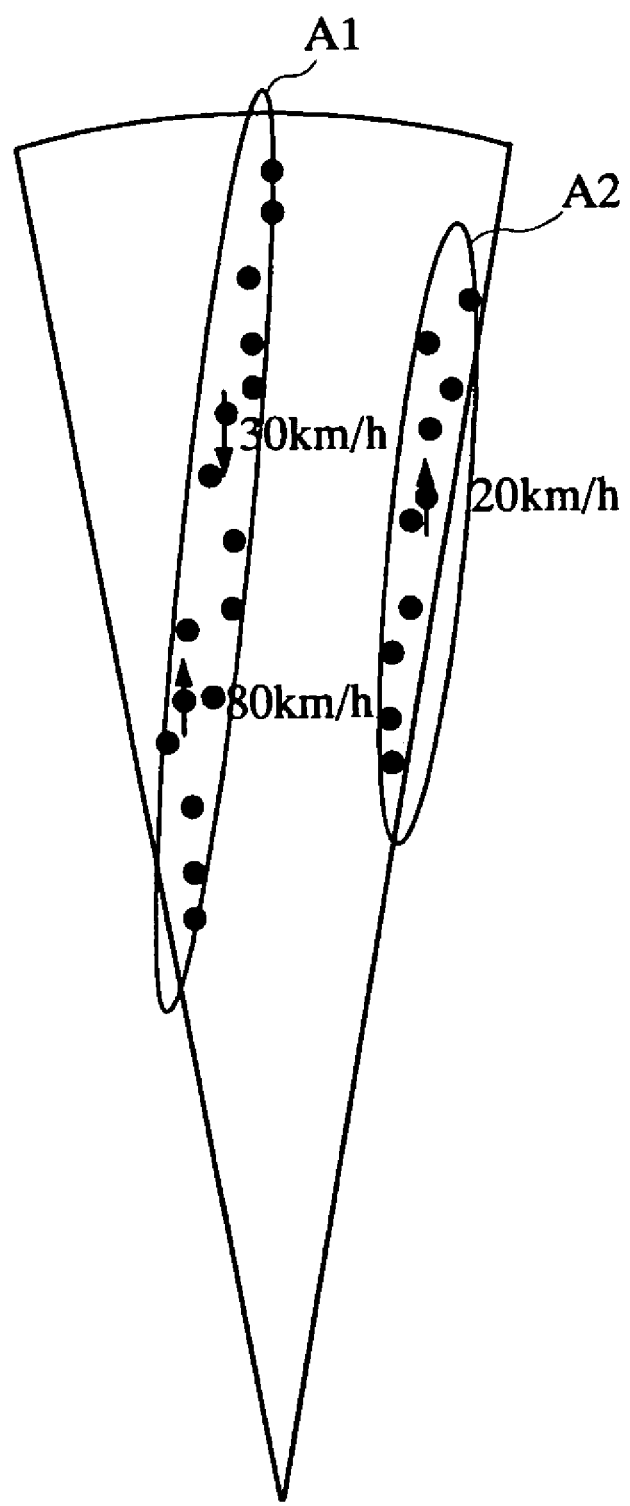
FIG. 11 shows an example moving object falsely detected in the continuous-stationary-object area.
Figure 12:
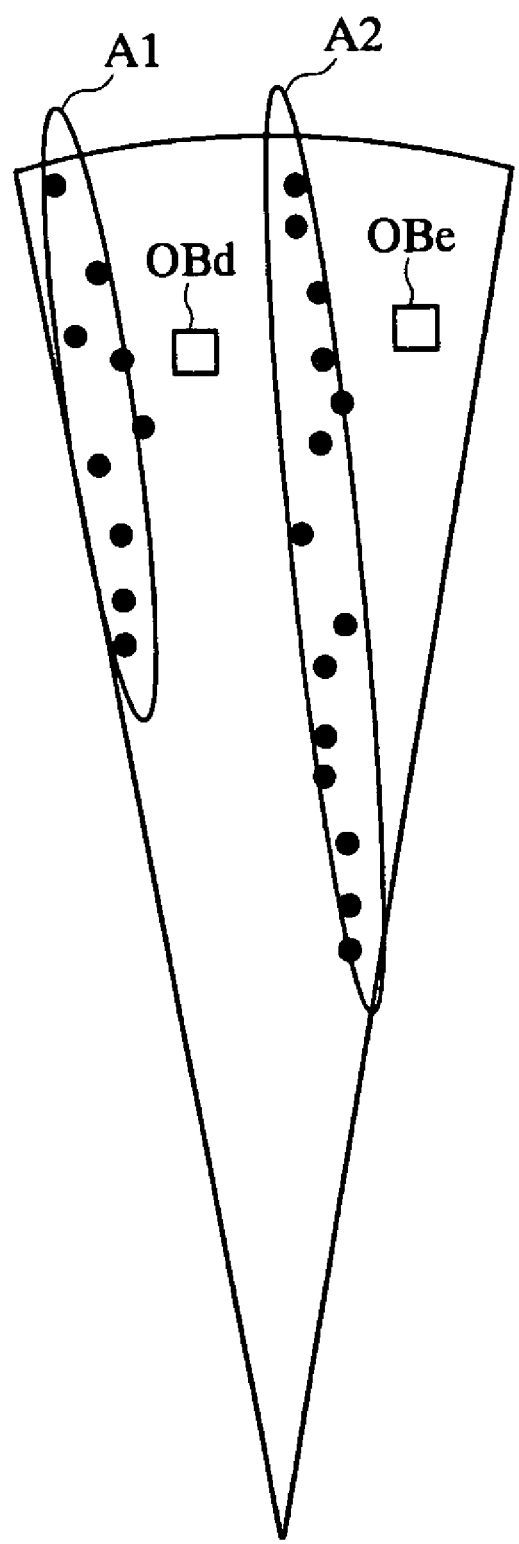
FIG. 12 shows an example location relationship between the continuous-stationary-object area and other detected objects.

Since an area determined to be the continuous stationary object in the above-described manner denotes the guardrail, the soundproof wall, the median, or the wall of the building, for example, a moving object does not exist in the area in normal times. Subsequently, if the moving object falsely exists in the area of the continuous stationary object, as a result of calculating the location and speed of the object based on the frequency difference extracted, as a pair, the pair is regarded as a pair generated by miss-pairing. For example, as shown in FIG. 11, moving objects that travel at the speed of 30 km/h and the speed of 80 km/h and that falsely exist in an area A1 of the continuous stationary object are regarded as a pair generated by miss-pairing. Similarly, a moving object that falsely exists in an area A2 of the continuous stationary object and that travels at the speed of 20 km/h is regarded as a pair generated by miss-pairing.

Further, where a moving object actually exists in the area of the continuous stationary object, the detection result can be removed, without adversely affecting the probability of detection of an object traveling on the road.

Further, since an object falsely detected beyond the area of the continuous stationary object is often a vehicle traveling on the lane beyond a median (the opposite lane), or a mirror image generated by the soundproof wall, the wall of a tunnel, and so forth, the detection result is removed. For example, in FIG. 12, an object OBd is a vehicle that actually travels ahead of the own vehicle. However, an object OBe is a mirror image of the OBd generated due to the area A2 of the continuous stationary object, or a vehicle reversely traveling on the opposite lane, where the area A2 is the median. Subsequently, the detection result relating to the object OBe is removed and not transmitted to a host system.

Further, since a sign, a land bridge, and so forth, that exist on the road are often detected, as stationary objects, the above-described removing processing is not performed for objects beyond a continuous stationary object existing along the traveling direction of the own vehicle. Further, the traveling direction of the own vehicle can be detected based on the steering angle of a steering wheel, the yaw rate, and the data obtained by a car navigation system or the like.

Figure 13:
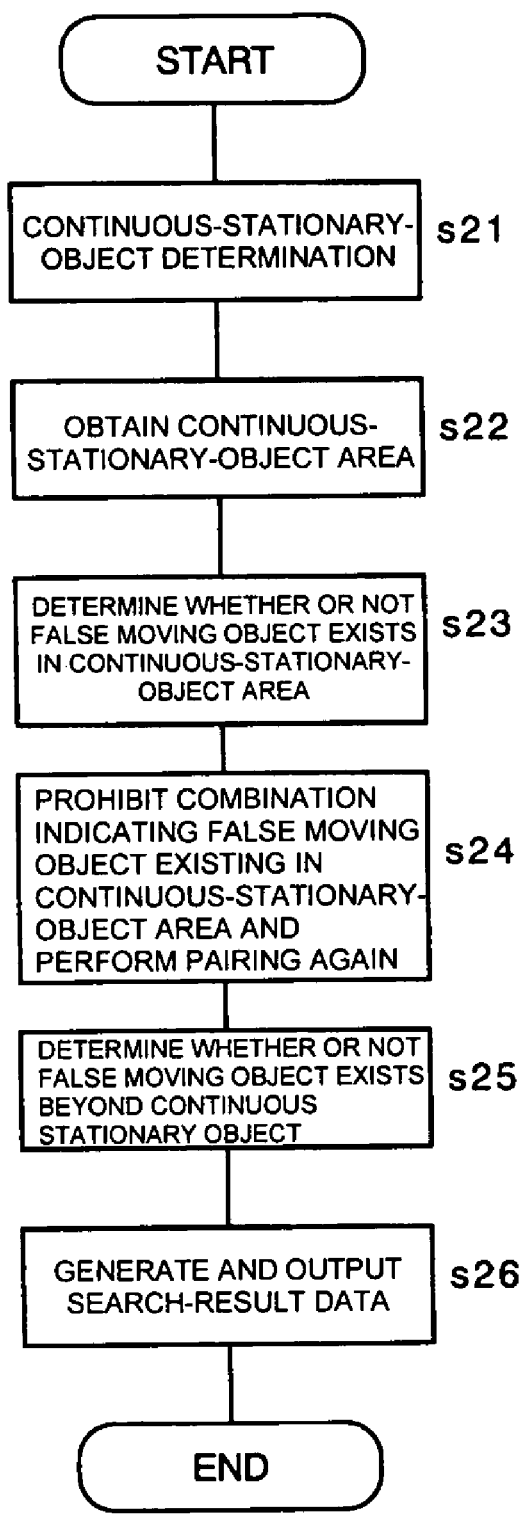
FIG. 13 is a flowchart showing processing procedures relating to the continuous stationary object.

FIG. 13 is a flowchart illustrating procedures performed for the above-described processing. The processing is performed, following the processing procedures described in the first embodiment, as shown in FIG. 5.

First, it is determined whether or not the above-described continuous stationary object exists, and an area including the continuous stationary object is calculated (s21→s22). Then, it is determined whether or not a moving object falsely exists in the area of the continuous stationary object (s23). A combination (pairing) indicating that the moving object falsely exists in the area of the continuous stationary object is determined to be mispairing, and pairing is performed again, so as to avoid performing such pairing (s24).

Further, where a moving object falsely exists beyond the area of a continuous stationary object, the detection result of the object is removed (s25). After that, data on a new detection result is generated and transmitted to the host system (s26).

As described above, the present invention allows extracting a pair that is a combination of projection portions observed in the frequency spectrums of beat signals in an ascending-modulation section and a descending-modulation section on the priority basis, where the frequency difference between the projection portions corresponds to a stationary object. Therefore, the stationary object can be easily detected and other objects other than the stationary object, such as vehicles traveling ahead, can be detected with increased stability.

Further, according to the present invention, relating to the coincidence of the signal intensity of a first projection portion observed in the frequency spectrum of a beat signal in the ascending-modulation section and that of a second projection portion observed in the frequency spectrum of a beat signal in the descending-modulation section, a weight is assigned to the signal-intensity coincidence of the pair showing the frequency difference corresponding to the stationary object. Therefore, the mispairing probability is relatively reduced and a pair generated by the stationary object can be detected with increased stability.

Further, according to the present invention, the beam azimuth of a transmission signal is changed over a predetermined scanning range, the coincidence of azimuths of the first and second projection portions is calculated, a combination showing high coincidence is extracted on the priority basis, as a pair, and a high weight is assigned to the azimuth coincidence of a pair showing the frequency difference corresponding to the stationary object. Subsequently, the mispairing probability is relatively reduced and the pair generated by the stationary object can be detected with increased stability.

Similarly, where a pair showing high coincidence of signal-intensity profiles in the azimuth direction is extracted on the priority basis, a high weight is assigned to the azimuth coincidence of a pair showing the frequency difference corresponding to the stationary object. Therefore, the mispairing probability is relatively reduced and the pair generated by the stationary object can be detected with increased stability.

Further, according to the present invention, a continuous stationary object is determined based on the continuity of the azimuth direction or distance direction of a pair showing the frequency difference corresponding to the stationary object. Therefore, the areas of continuous stationary objects forming the majority of detected objects can be detected with stability and moving objects such as vehicles traveling relatively ahead can be detected with stability.

Further, according to the present invention, where a moving object is falsely detected in the area of the continuous stationary object, a pair extracted corresponding thereto is determined to be an error. Therefore, pair-extraction errors are reduced with increased stability.

Further, according to the present invention, where an object is detected beyond the continuous stationary object, the detection result is not output. Therefore, it becomes possible to output only a significant object of detected objects to the host system, reduce the entire data processing amount, and perform processing based on the detection result with high speed.

INDUSTRIAL APPLICABILITY

Thus, the radar of the present invention can easily detect a stationary object and search for an object other than the stationary object, such as a vehicle traveling ahead, with increased stability.

The invention claimed is:

1. A radar comprising:
   a transmission-and-reception element arranged to transmit a transmission signal including an ascending-modulation section where a frequency gradually increases and a descending-modulation section where the frequency gradually decreases in an alternating manner and arranged to receive a reception signal including a reflection signal transmitted from an object;
   a frequency-analysis element arranged to obtain data on the frequency spectrum of a beat signal indicating the frequency difference between the transmission signal and the reception signal;
   a pair-extraction element arranged to extract a pair of first and second projection portions both caused by the object, where the first projection portion is observed in the frequency spectrum of a beat signal of the ascending-modulation section and the second projection portion is observed in the frequency spectrum of a beat signal of the descending-modulation section;
   a detection element arranged to detect at least one of a relative distance and a relative speed of the object based on frequencies of the two projection portions forming the pair; and
   a data input element arranged to input data on the moving speed of a moving object having the radar mounted thereon; wherein
   the pair-extraction element calculates the frequency difference between the projection portions observed in the frequency spectrums of the beat signals in the ascending-modulation section and the descending-modulation section based on the moving-speed data, where the frequency difference corresponds to the relative speed between the moving object having the radar mounted thereon and a stationary object, and extracts a pair that most closely corresponds to the frequency difference.

2. The radar according to claim 1, wherein the pair-extraction element calculates a coincidence of the signal intensity of the first projection portion and a signal intensity of the second projection portion, extracts a combination showing higher coincidence than other projection portions as a pair, and assigns a higher weight to the signal-intensity coincidence of the pair corresponding to the frequency difference than to the signal-intensity coincidence of the other projection portions.

3. The radar according to claim 2, further comprising a scanning element arranged to change the beam azimuth of the transmission signal over a predetermined scanning range, wherein the pair-extraction element calculates the coincidence of azimuths of the first and second projection portions, extracts a combination showing higher coincidence than other projection portions, as a pair, and assigns a higher weight to the azimuth coincidence of the pair corresponding to the frequency difference than to the azimuth coincidence of the other protection portions.

4. The radar according to claim 3, further comprising a scanning element arranged to change the beam azimuth of the transmission signal over a predetermined scanning range, wherein the pair-extraction element calculates the degree of correlation between signal-intensity profiles in the azimuth direction of the first and second projection portions, extracts a combination showing a higher correlation degree than other protection portions, as a pair, and assigns a higher weight to the correlation degree of the pair showing the frequency difference than to the correlation degree of the other protection portions.

5. The radar according to claim 2, further comprising a scanning element arranged to change the beam azimuth of the transmission signal over a predetermined scanning range, wherein the pair-extraction element calculates the degree of correlation between signal-intensity profiles in the azimuth direction of the first and second projection portions, extracts a combination showing a higher correlation degree than other projection portions, as a pair, and assigns a higher weight to the correlation degree of the pair showing the frequency difference than to the correlation degree of the other protection portions.

6. The radar according to claim 1, further comprising a scanning element arranged to change the beam azimuth of the transmission signal over a predetermined scanning range, wherein the pair-extraction element calculates the coincidence of azimuths of the first and second projection portions, extracts a combination showing higher coincidence than other protection portions as a pair, and assigns a higher weight to the azimuth coincidence of the pair corresponding to the frequency difference than to the azimuth coincidence of the other projection portions.

7. The radar according to claim 6, further comprising a scanning element arranged to change the beam azimuth of the transmission signal over a predetermined scanning range, wherein the pair-extraction element calculates the degree of correlation between signal-intensity profiles in the azimuth direction of the first and second projection portions, extracts a combination showing a higher correlation degree that other projection portions, as a pair, and assigns a higher weight to the correlation degree of the pair showing the frequency difference than to the correlation degree of the other protections.

8. The radar according to claim 1, further comprising a scanning element arranged to change the beam azimuth of the transmission signal over a predetermined scanning range, wherein the pair-extraction element calculates the degree of correlation between signal-intensity profiles in the azimuth direction of the first and second projection portions, extracts a combination showing a higher correlation degree that other projection portions, as a pair, and assigns a higher weight to the correlation degree of the pair showing the frequency difference than to the correlation degree of the other projection portions.

9. The radar according to claim 1, further comprising a detection element arranged to detect a continuous stationary object based on a predetermined number of the pairs showing the frequency difference that exists along at least one of the azimuth direction and the distance direction.

10. The radar according to claim 9, further comprising a pair extraction error determining element that detects an error in the pair extraction process based on an object corresponding to a pair that does not correspond to the frequency difference in a predetermined area where the continuous stationary object exists.

11. The radar according to claim 10, further comprising an output element that does not output a detection result when a predetermined object is detected beyond the continuous stationary object.

12. The radar according to claim 9, further comprising an output element that does not output a detection result when a predetermined object is detected beyond the continuous stationary object.

13. The radar according to claim 1, further comprising a pair extraction error determining element that detects an error in the pair extraction process based on an object corresponding to a pair that does not correspond to the frequency difference in a predetermined area where the continuous stationary object exists.

14. The radar according to claim 13, further comprising an output element that does not output a detection result when a predetermined object is detected beyond the continuous stationary object.

15. The radar according to claim 1, further comprising an output element that does not output a detection result when a predetermined object is detected beyond the continuous stationary object.

* * * * *